(12) United States Patent
Chen et al.

(10) Patent No.: US 7,822,629 B2
(45) Date of Patent: Oct. 26, 2010

(54) CUSTOMER PROFILING APPARATUS FOR CONDUCTING CUSTOMER BEHAVIOR PATTERN ANALYSIS, AND METHOD FOR COMPARING CUSTOMER BEHAVIOR PATTERNS

(75) Inventors: Qiming Chen, Sunnyvale, CA (US);
Umeshwar Dayal, Saratoga, CA (US);
Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1700 days.

(21) Appl. No.: 09/464,311

(22) Filed: Dec. 15, 1999

(65) Prior Publication Data
US 2003/0105658 A1   Jun. 5, 2003

(51) Int. Cl.
*G06Q 99/00* (2006.01)
(52) U.S. Cl. .................. 705/10; 705/7; 705/11
(58) Field of Classification Search ............ 705/1, 705/7, 10, 11
See application file for complete search history.

(56) References Cited

U.S. PATENT DOCUMENTS

| 5,692,181 A | 11/1997 | Anand et al. ........... 707/102 |
| 5,848,396 A * | 12/1998 | Gerace ............... 705/10 |
| 5,852,819 A | 12/1998 | Beller ................ 707/1 |
| 5,875,285 A | 2/1999 | Chang ................ 706/53 |
| 5,905,985 A | 5/1999 | Malloy et al. .......... 707/100 |
| 5,907,831 A * | 5/1999 | Lotvin et al. .......... 705/14 |
| 5,956,693 A * | 9/1999 | Geerlings ............. 705/14 |
| 5,974,396 A * | 10/1999 | Anderson et al. ........ 705/10 |
| 5,991,735 A * | 11/1999 | Gerace ............... 705/10 |
| 6,115,693 A * | 9/2000 | McDonough et al. ...... 705/10 |
| 6,128,624 A * | 10/2000 | Papierniak et al. ...... 707/104 |
| 6,341,267 B1 * | 1/2002 | Taub ................. 705/11 |
| 6,526,389 B1 * | 2/2003 | Murad et al. ........... 705/10 |

FOREIGN PATENT DOCUMENTS

EP   891069 A2 *   1/1999

OTHER PUBLICATIONS

Derks et al, "Practical experiences with materialized views in a very large data store for telecommunication service management", Database and Expert Systems Applications, 1998. Proceedings. Ninth International Workshop on Digital Object Identifier: 10.1109/DEXA.1998.707509, Publication Year: 1998, pp. 881-886.*

* cited by examiner

*Primary Examiner*—Akiba K Robinson Boyce (57) ABSTRACT

A customer profiling apparatus is provided for conducting customer behavior pattern analysis. The apparatus includes processing circuitry, a data warehouse, a profiling engine, and at least one computer program. The processing circuitry is operative to process customer records. The data warehouse is coupled with the processing circuitry and is configured to store the processed customer records. The profiling engine communicates with the data warehouse and is operative to build and update customer behavior profiles by mining the customer records that flow into the data warehouse. The at least one computer program is performed by the profiling engine, and is operative to define behavior profiles as data cubes and derive similarity measures on patterns extracted from the behavior profiles. A method is also provided.

23 Claims, 5 Drawing Sheets

CUSTOMER PROFILING APPARATUS FOR CONDUCTING CUSTOMER BEHAVIOR PATTERN ANALYSIS, AND METHOD FOR COMPARING CUSTOMER BEHAVIOR PATTERNS

FIELD OF THE INVENTION

The present invention pertains to the field of data analysis. More particularly, this invention relates to methods and apparatus for profiling customer behavior.

BACKGROUND OF THE INVENTION

In recent years, the ability to profile customer behavior and to conduct associated pattern analysis has become desirable. For example, the need for improved techniques in these areas has recently been identified in the fast-growing fields of telecommunications and electronic commerce, or e-commerce. However, existing tools and techniques do not deliver sufficient capabilities.

For example, one technique involves creating customer behavior profiles from very large collections of transaction data. More particularly, a database is formed with transaction data, the database is batch updated, and the database is structured for fast online queries and summaries by department managers. For example, in telecommunications applications, hundreds of millions of call records may have to be processed daily in order to create and incrementally update customer calling behavior profiles. These customer calling behavior profiles are contained within data warehouse systems. Hence, such data warehouses can contain enormous amounts of data which can make searching for one customer profile unwieldy and time consuming.

Therefore, there exists a present need for improved techniques for profiling customer behavior.

SUMMARY OF THE INVENTION

A profiling apparatus includes a data-warehouse and an OLAP based, scalable and flexible profiling engine. The apparatus is configured to define profiles using probability distributions, and compute the profiles using OLAP operations on multidimensional and multilevel data cubes. A formalism is used for defining and computing various similarity measures on patterns derived from behavior profiles. One profiling engine has been implemented using a commercial data warehouse server and a multidimensional OLAP server. Experience has revealed the simplicity and powerfulness of OLAP-based solutions to probability-oriented, scalable profiling and multilevel, multidimensional pattern analysis and comparison.

According to one aspect, a customer profiling apparatus is provided for conducting customer behavior pattern analysis. The apparatus includes processing circuitry, a data warehouse, a profiling engine, and at least one computer program. The processing circuitry is operative to process customer records. The data warehouse is coupled with the processing circuitry and is configured to store the processed customer records. The profiling engine communicates with the data warehouse and is operative to build and update customer behavior profiles by mining the customer records that flow into the data warehouse. The at least one computer program is performed by the profiling engine, and is operative to define behavior profiles as data cubes and derive similarity measures on patterns extracted from the behavior profiles.

According to another aspect, a profiling apparatus is provided. The profiling apparatus includes a data warehouse, a profiling engine, and a computer application program. The data warehouse is configured to store customer records. The profiling engine communicates with the data warehouse and is operative to generate customer behavior profiles from the customer records within the data warehouse. The computer application program is implemented on the profiling engine and is operative to represent behavior profiles as patterns and derive similarity measures of the patterns usable to profile customer behavior.

According to yet another aspect, a method is provided for comparing customer behavior patterns. The method includes: providing call data in the form of call data records to a data warehouse; loading the call data records into an OLAP server; generating a profile-snapshot cube accommodating multiple customers; in combination with generating the profile-snapshot cube, generating a profile cube for the same set of customers from the data warehouse; updating the profile cube by merging the profile cube with the profile-snapshot cube; and storing the updated profile cube in the data warehouse.

DESCRIPTION OF THE DRAWINGS

Preferred embodiments of the invention are described below with reference to the following accompanying drawings depicting examples embodying the best mode for practicing the invention.

FIG. 4 is a conceptual diagram illustrating the manner in which a profile-snapshot cube (PCS) is populated using binning techniques.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Profiling customer behavior has become increasingly important for many applications such as fraud detection, targeted marketing and promotion. Customer behavior profiles are created from very large collections of transaction data. For example, in telecommunication applications, hundreds of millions of call records may have to be processed daily in order to create and incrementally update customer calling behavior profiles.

Figure 1:
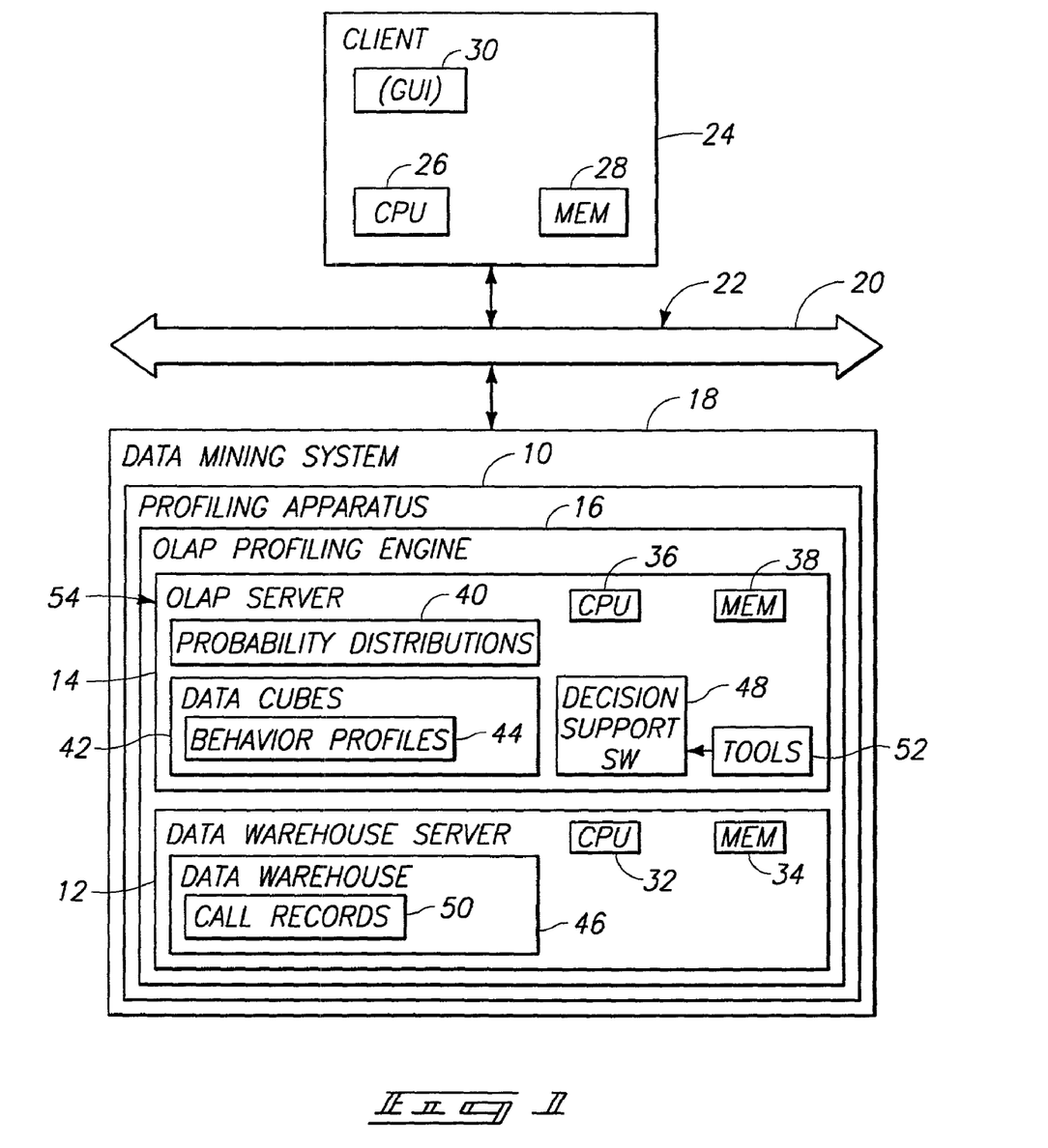
FIG. 1 is a schematic block diagram illustrating an exemplary hardware environment used to implement one aspect of the present invention.

As a result, an apparatus for profiling customer behavior has been developed and is identified in FIG. 1 by reference numeral 10. Profiling apparatus 10 includes a data-warehouse server 12 and an OLAP server 14. Such OLAP profiling engine 16 comprises an OLAP-based scalable and flexible profiling engine 16 that can be used in many applications.

As used herein, profiling engine refers to a specialized processor used to implement customer behavior analysis. According to one implementation, profiling engine 16 is an OLAP-based specialized processor for performing customer behavior analysis. The profiling of customer behavior aims at extracting patterns of customer activities from transactional data, and using such patterns to provide guidelines for service provisioning, trend analysis, abnormal behavior detection, and other related customer patterns of activity. Profiling engine 16 is capable of building and updating customer calling behavior profiles incrementally by mining call records that flow into a data-warehouse on a daily basis, deriving calling patterns from profiles, and analyzing and comparing the similarity of calling patterns. According to one implementation, an OLAP server is used as a scalable computation engine in order to support profile computation, maintenance and utilization. According to such one implementation, profiling engine 16 builds and incrementally updates customer calling behavior profiles by mining call records flowing into a data-warehouse on a daily basis, using an OLAP server. Secondly, profiling engine 16 maintains profiles by staging data between a data-warehouse and an OLAP multidimensional database. Thirdly, profiling engine 16 derives multilevel and multidimensional customer calling patterns from profiles for analysis purposes. Finally, profiling engine 16 compares the similarity of customer calling patterns from volume and probability distribution points of view, and generates multilevel and multidimensional similarity measures, with such measures being used in various applications; for example, for use in fraud detection. Further according to the one implementation, profiling engine 16 is built on top of an Oracle-8 based data-warehouse and an Oracle Express, and an OLAP server. Call data records, customer behavior profiles, and other reference data are stored within the warehouse. The call data records are fed in daily and are dumped to archive after use. In this manner, the OLAP server is used as a computation engine for creating and updating profiles, deriving calling patterns from profiles, as well as analyzing and comparing calling patterns.

According to one implementation, profiling apparatus 10 is provided within a data mining system 18 that is implemented over a communication platform 20 such as a network 22. According to one construction, communication platform 20 comprises a client/server network 22 configured to process applications designed for client/server architectures. Specific implementations for network 22 include the Internet, or the World Wide Web (WWW). Accordingly, client/server network 22 includes a client 24 as well as servers 12 and 14. Client 24 includes a central processing unit (CPU) 26, memory 28, and a graphical user interface (GUI) 30. Similarly, server 12 includes central processing unit (CPU), or processing circuitry, 32 and memory 34, while server 14 includes central processing unit (CPU) 36 and memory 38. OLAP server 14 also includes probability distributions 40 and data cubes 42. Behavior profiles 44 are provided within data cubes 42.

As shown in FIG. 1, behavior profiles 44 are first defined by probability distributions, then are computed using OLAP operations on multidimensional and multilevel data cubes 42. A formalism is provided for defining and computing various similarity measures on patterns derived from these behavior profiles.

According to one implementation, profiling engine 16 is realized using commercial data warehouse server 12 and multidimensional OLAP server 14. Experience has revealed the simplicity and powerfulness of OLAP-based solutions to probability-oriented, scalable profiling and multilevel, multidimensional pattern analysis and comparison.

I. Overview

The profiling of customer behavior is carried out with the aim of extracting patterns of customer activities from transactional data. Extracted patterns are then used to provide guidelines when making business decisions such as when determining service provisioning, performing trend analysis, and detecting abnormal behavior. Such profiling and analysis has become increasingly important in a variety of application domains, such as fraud detection, personalized marketing and commercial promotion. Such profiling and analysis has also given rise to the need for a scalable infrastructure in order to support filtering, data mining and continuous analysis of massive amounts of transaction data. The provision of such an infrastructure has been realized with implementation of the data-warehousing and OLAP technology identified by data mining system 18 of FIG. 1.

In order to realize profiling apparatus 10 of data mining system 18, the construction and application of customer behavior profiles is obtained from telephone call data for the purpose of conducting fraud detection. Call fraud is a serious problem that generates a significant amount of revenue loss each year for telecommunication service providers. One way of carrying out fraud detection is to discover abnormal calling behavior. Typically, a customer's calling behavior is represented by the composition and periodic appearance of the following features. One feature is to identify the callees, or the numbers that have been called. Another feature is to identify when calls are made, or the time windows in which the calls have been made. Yet another feature is to identify how long specific calls last, or the duration of specific calls.

Behavior-based fraud detection may be further classified into the following two categories. The first is "threshold based fraud detection", such as a call determined to be suspicious if its duration is greater than 24 hours. A second is where a call is determined to be suspicious if its duration is greater than 4 hours, and the call is made in the evening. The second is "pattern based fraud detection", such as where a specific caller, as identified by phone number, is identified as being suspicious if the caller's calling pattern is similar to a previously known fraudulent pattern, based upon comparison with the previously known fraudulent pattern.

The profiling of callers' behavior is significant for both of the above-described kinds of fraud detection. In the case of the first category of threshold-based fraud detection, without having information about personalized calling behavior, only generalized thresholds may be set, such as considering generally that a call is determined to be suspicious if it lasts over 24 hours. With the availability of a customer's calling behavior profile, personalized, rather than generalized thresholds can be set, so that, for example, calls by a specific individual identified as "John" which last for 4 hours are considered usual, but calls by a specific individual identified as "Jane" which last for 2 hours are considered unusual. Thus personalized or group-based thresholds can be used in order to provide more precise fraud detection than is available using more generalized thresholds. Similarly, pattern based fraud detection is based on profiles that carry out pattern matching. Each new customer's calling behavior is profiled and compared against known fraudulent profiles. Customer profiles are also useful for other summary information oriented applications.

In order to create and update effective customer behavior profiles, hundreds of millions of call records are required to be processed nearly every day. In order to carry this out more efficiently, a scalable and maintainable framework has been developed to support such profiling. More particularly, profiling engine 16, according to one construction, is built on top of an Oracle-8 based telecommunication data-warehouse 46 and includes Oracle Express. Oracle Express is a multidimensional OLAP server 14 that implements OnLine Analytical Processing (OLAP). OLAP server 14 implements decision support software 48 that allows a user to quickly analyze information that is summarized into multidimensional views and hierarchies.

According to OLAP, profiles and calling patterns are represented as multidimensional cubes 42. Profiling engine 16 is capable of building and updating customer calling behavior profiles incrementally by mining call records that flow into the data-warehouse daily, deriving "calling patterns" from profiles, and analyzing and comparing the similarity of "calling patterns". There exists practical value in using an OLAP server 14 as a scalable computation engine, or profiling engine, 16 in order to support profile computation, maintenance and utilization. Profiles and "calling patterns" are based on the probability distribution of call volumes. OLAP can be used in order to compute these probability distributions as described below in further detail.

OLAP technology within OLAP server 14 is used to analyze data maintained in data-warehouses such as data-warehouse 46. More particularly, OLAP tools 52 are used to support large-scale data mining. One significant feature provided by Applicant's invention is the ability to use OLAP based customer behavior profiling and pattern analysis.

As will be described below in greater detail, behavior profiling is carried out using probability distributions. Also described below in greater detail is one suitable profiling engine architecture 54 for profiling engine 16. Furthermore, exemplary algorithms are described below for computing profile and calling pattern cubes.

II. Probability Distribution Based Profiling Using OLAP

A. Behavior Profiling with Probability Distribution

In order to implement customer behavior profiling, a user implementing the profiling need to decide which features, or dimensions, are particularly relevant to the profiling being considered. For example, when implementing a customer telephone calling behavior profiling application, exemplary features of interest could be specific telephone-numbers, call volume (i.e., the number of calls made), call duration, time of day, and day of week for a customer's outgoing and incoming calls.

Secondly, the granularity of each feature needs to be selected. Thus, the time of day feature may be represented by the following time-bins: 'morning'; 'afternoon'; 'evening'; and 'night'. The duration feature may be represented by: 'short' (shorter than 20 minutes); 'medium' (20 to 60 minutes); or 'long' (longer than 60 minutes). Finally, a profiling interval (e.g., 3 months) is chosen over which the customer profiles will be constructed, and a periodicity of the profiles (e.g., weekly) is also chosen.

According to one exemplary application, a customer's profile is a weekly summarization of the customer's calling behavior during the profiling interval. Based on the profiled information, calling patterns of individual customers may be derived. As one example, the following three kinds of calling patterns can be considered:

1) "Fixed-value based calling pattern" represents a customer's calling behavior with fixed values showing the customer's "average" behavior. For example, the following calling pattern from number A to number B says that on the average calls are short.

TABLE 1

A fixed value based calling pattern

| morning | afternoon | evening |
|---------|-----------|---------|
| medium  | short     | long    |

2) "Volume based calling pattern" summarizes a customer's calling behavior by counting the number of calls of different duration in different time-bins. For example, the following calling pattern from number A to number B says that there were 350 short calls carried out in the mornings of the profiling period.

TABLE 2

A volume based calling pattern

|        | morning | afternoon | evening |
|--------|---------|-----------|---------|
| short  | 350     | 30        | 80      |
| medium | 100     | 40        | 200     |
| long   | 50      | 30        | 120     |

3) "Probability distribution based calling pattern" represents a customer's calling behavior with probability distributions. For example, the following calling pattern from number A to number B says that 10% of the calls in the morning were long, 20% were medium, and 70% were short.

TABLE 3

A probability distribution based calling pattern

|        | morning | afternoon | evening |
|--------|---------|-----------|---------|
| short  | 0.7     | 0.3       | 0.2     |
| medium | 0.2     | 0.4       | 0.5     |
| long   | 0.1     | 0.3       | 0.3     |

According to Applicant's invention, volume-based calling patterns are used as an intermediate step when deriving probability-based calling patterns.

Probability distribution based calling patterns provide more fine-grained representation of dynamic behavior than fixed value based ones. Probability distribution based calling patterns also allow calling patterns corresponding to different lengths of profiling interval to be compared. For example, for the case of a threshold-based fraud detection application, a long duration call may be noticed before reaching an absolute threshold, and the call can be monitored with increasing levels of scrutiny as the probability of fraud becomes higher and higher. Probability distribution based calling patterns also provide more details of individual behavior, which has not been available to the same degree using fixed-value based calling patterns.

B. Computing Probability Distribution Based Calling Patterns Using OLAP

When using OLAP, profiles and calling patterns are represented as cubes 42 (see FIG. 1). A cube has a set of underlying dimensions, and each cell of the cube is identified by one value from each of these dimensions. The set of values of a dimension D, called the domain of D, may be limited (by the OLAP limit operation) to a subset. A sub-cube (slice or dice) can be derived from a cube C by dimensioning C by a subset of its dimensions, and/or by limiting the value sets of these dimensions.

As mentioned above, the profile of a customer is a weekly summarization of the customer's activities in the profiling period. In order to be more efficient, according to one prototype profiling system a group is made of the information for profiling multiple customers' calling behavior into a single profile cube with dimensions <duration, time, dow, callee, caller>, where dow stands for day_of_week (e.g., Monday, . . . , Sunday), callee and caller are calling and called phone numbers. The value of a cell in a profiling cube measures the volume; i.e., number of calls, made in the corresponding duration-bin, time-bin in a day, and day of week, during the profiling period. In this way, a profile cube records multiple customers' outgoing and incoming calls week by week. From such a multi-customer profile cube, calling pattern cubes of individual customers may be derived. They have similar dimensions as the profile cubes except that a calling pattern cube for outgoing calls is not dimensioned by caller, and a calling pattern cube for incoming calls is not dimensioned by callee, because such cubes each pertain to a single customer.

In order to represent such calling behavior at multiple levels, dimensions dow, time and duration are defined as hierarchical dimensions, along which the calling pattern cubes can be rolled up. A hierarchical dimension D contains values at different levels of abstraction. Associated with D there are: a) a level-dimension describing the levels of D; b) a relation mapping each value of D to the appropriate level; and c) a relation mapping each value of D to its parent value (the value at the immediate upper level). The above relationships provide sufficient information to roll up cube C along dimension D; that is, to calculate the total of cube data at the upper levels using the corresponding lower-level data. A cube may be rolled up along multiple underlying dimensions. For example, dimensions duration, time and dow are defined in the following way:

1. Dimension dow is associated with dimension dowLevel with values 'dd', 'ww', 'week'. dow has values 'MON', . . . , 'SUN' at the lowest level (dd level), 'wkday', 'wkend' at a higher level (ww level), and 'week' at the top level ('week' level).
2. Dimension time is associated with dimension timeLevel with values 'time_bin' and 'time_all'. time has values 'night', 'morning', 'afternoon' and 'evening' at 'time_bin' level (bottom-level), and 'allday' at the 'time_all' level (top-level).
3. Dimension duration is associated with dimension durLevel with values 'dur_bin' and 'dur_all'. duration has values 'short', 'medium', 'long' at 'dur_bin' level (bottom-level), and 'all' at 'dur_all' level (top-level).

For example, volume based calling pattern cube "CB.o" represents the outgoing calling behavior of a customer. In Oracle Express, that is defined in the following way:

Define CB.o variable int <sparse <duration time dow callee>> inplace

Similarly, volume based cube "CB.d" represents incoming calling behavior. In Oracle Express, that is defined in the following way:

Define CB.d variable int <sparse <duration time dow caller>> inplace

The cell values of the above-described cubes are the number of calls falling into the given 'slot' of time, duration, day of week, etc. When generated, cubes "CB.o" and "CB.d" are rolled up along dimensions duration, time and dow. Therefore, CB.o (duration 'short', time 'morning', dow 'MON')

measures the number of short-duration calls this specific customer made to each callee (dimensioned by callee) on Monday mornings during the profiling interval. Similarly, CB.o (duration 'all', time 'allday', dow 'week') measures the number of calls this customer made to each callee (total calls dimensioned by callee) during the profiling interval.

Cubes representing probability distribution based calling patterns are derived from volume based pattern cubes. Depending on application requirements, various cubes may be derived. For example, cube "P_CB.o" for a customer represents the dimensioned probability distribution of outgoing calls over all the outgoing calls made by this customer, and is derived from cube "CB.o" in the following way, Define P_CB.o formula decimal <duration time dow callee>

EQ (CB.o/total(CB.o (duration 'all', 'allday', dow 'week')))

where total (CB.o (duration 'all', 'allday', dow 'week')) is the total calls this customer made to all callees. Remember that cube "CB.o" has already been rolled up; hence, we can use its top-level value). The value of a cell is the above probability corresponding to the underlying dimension values.

As another example, cube "P1_CB.o" is dimensioned by duration and callee, and represents the probability distribution of a customer's outgoing calls over his total calls to the corresponding callee, and is also derived from cube "CB.o" as specified in the following manner, Define P1_CB.o formula decimal <duration time dow callee>

EQ (CB.o/total (CB.o (duration 'all', 'allday', dow 'week'), callee))

where total (CB.o (duration 'all', 'allday', dow 'week') is the total calls this customer made to each callee, dimensioned by callee. The value of a cell is the above probability corresponding to the underlying dimension values. Calling pattern cubes for incoming calls can be defined similarly.

C. Calling Pattern Similarity Comparison

Calling pattern comparison is important for such applications as fraud detection. Since the similarity of customer behavior can be represented from different angles, we compare calling patterns that have been derived from customer calling behavior profiles, rather than by comparing profiles directly. For example, some calling patterns might be similar in the volume of calls to the same set of callees. Others might be similar in the time of these calls, such as those that occur late at night. Our objective, therefore, is to enable the comparison of calling patterns along multiple dimensions and at multiple levels of the dimension hierarchies.

Given two input calling pattern cubes, say $C_1$ and $C_2$, the output of the comparison is a similarity cube, say $C_s$, rather than a single value. The similarity cube $C_1$ can be dimensioned differently from cubes $C_1$ and $C_2$ which are being compared. Each cell of $C_s$ represents the similarity of a pair of corresponding sub-cubes, or slices or dices, of $C_1$ and $C_2$.

In order to support such cube similarity comparison, the following should be provided:

1. The mapping from a cell of $C_s$ to a pair of corresponding sub-cubes of $C_1$ and $C_2$.
2. The algebraic structure for summarizing cell-wise comparison results of a pair of sub-cubes to a single similarity measure to be stored in the corresponding cell of $C_s$.

We have introduced the following two approaches. One treats a sub-cube as a bag, and summarizes cell-wise comparison results based on bag overlap. The other treats a sub-cube as a vector, and summarizes cell-wise comparison results based on vector distance.

In order to compare customers' behavior from multiple aspects (e.g., from volume or probability distribution perspective), different calling patterns may need to be compared. Hence, multiple similarity cubes may need to be generated. The choice of which calling pattern cubes to use and which similarity cubes to generate will be application specific.

D. Bag Overlap Based Cube Similarity

Bag overlap based similarity comparison is applicable to a special kind of cubes called "count-cubes". The cell-values of a count-cube are non-negative integers for measuring counts. A volume based calling pattern cube, as defined in this application, is a count-cube.

The similarity of two bags may be defined on the basis of their overlap. Let A and B be bags, $\sigma A(x)$ be the count of element x in bag A; that is, the number of copies of x in A, and $\subseteq, \cap$ and $\cup$ be bag containment, intersection and union. Briefly speaking, they are defined as illustrated below.

$A \subseteq B \Leftrightarrow (\forall x \in A) \sigma_A(x) \leq \sigma_B(x)$ $A \subseteq B \Leftrightarrow glb \subseteq (A,B)$ where $glb \subseteq$ stands for the "greatest lower bound" of A and B under the bag-containment relationship, that is the largest bag C such that $C \subseteq A$ and $C \subseteq B$.

$A \cup B \Leftrightarrow lub \subseteq (A,B)$ where $lub \subseteq$ stands for the "least upper bound" of A and B under the bag-containment relationship, that is the smallest bag C such that $A \subseteq C$ and $B \subseteq C$. With these notions, we define the similarity of bag A and B, $\mu(A,B)$, as $$\mu(A, B) = \frac{\mu_{A/B} + \mu_{B/A}}{2} \text{ where } \mu_{A/B} = \frac{|A \cap B|}{|B|} \text{ and } \mu_{B/A} = \frac{|A \cap B|}{|A|}$$

Following is a step-by-step explanation of how to apply these formalisms to compare the similarity of count-cubes.

First we view a count-cube as a bag in the following way. An element of the bag is identified by the list of dimension-values underlying a cell of the cube, and the count of that element (i.e., the copies of that element in the bag) is represented by the cell value. A cell value 0 means the non-existence of that element in the bag. Thus, for example, CB.o(duration 'short', time 'morning', dow 'MON', callee '4089194444')=5 stands for a bag element with count 5.

Next, since two count-cubes, say $C_1$ and $C_2$, can be viewed as bags, they can be compared using the above bag-overlap based similarity measure, denoted by $\mu: <C_1, C_2> \rightarrow [0,1]$.

Further, any sub-cube, or slice or dice, of a count-cube is also a count-cube, and thus can be mapped to a bag. This allows the corresponding sub-cubes of two count-cubes to be compared based on bag-overlap.

Given two count-cubes $C_1[D]$ and $C_2[D]$ with the same underlying dimensions $D=\{D_1, \ldots, D_n\}$, comparing their similarity and putting the comparison results into a similarity cube $C_s[D_s]$, are handled as follows:

1. Define the similarity cube $C_s[D_s]$, with each cell of $C_s$ corresponding to a sub-cube of $C_1$ (and $C_2$). This requires us to provide a mapping from a cube-cell e dimensioned by $D_s$ to a sub-cube C' dimensioned by $D' \subseteq D$, expressed as $e[D_s] \rightarrow C'[D']$ The following two general types of cell-to-subcube mappings have been introduced:

(a) Type A ("projection") cell-to-subcube mapping: making $D_s \subseteq D$. As a result, each cell of $C_S$ is mapped to a sub-cube of $C_1$ (or $C_2$). As an example, assume that $C_1$ and $C_2$ are dimensioned by <duration, time, dow, callee>, but $C_s$ by <duration, time dow>. Then each cell of $C_s$ corresponds to a sub-cube of $C_1$ (and $C_2$) based on the same values as e on dimension duration, time and dow but all values on dimension callee.

(b) Type B ("change level") cell-to-subcube mapping: having dimension $d \in D$ such that a value of $d_s$ corresponds to multiple values of d. In other words, there exist a one-to-many relationship between $d_s$ and d. For example, if $C_1$ and $C_2$ are dimensioned by <duration, time, dow, callee> but $C_s$ by <durLevel, timeLevel, dowLevel>, and there exist many-to-one mappings from duration, time and dow to durLevel, timeLevel and dowLevel, respectively, then each cell of $C_s$ corresponds to a sub-cube of $C_1$ (and $C_2$). These sub-cubes are based on multiple values on dimension duration, time and dow.

2. For each cell e of $C_s$, identify the pair of corresponding sub-cubes of $C_1$ and $C_2$, say $c_1$ and $c_2$, then the value of e is the similarity of $c_1$ and $c_2$ compared based on bag-overlap, i.e., value(e)=$\mu(c_1, c_2)$ E. Vector Distance Based Cube Similarity Conceptually, cubes may also be viewed as vectors, and the cubes may be compared for similarity based on vector distance.

Given vectors $<t_1, \ldots, t_n>$ and $<t'_1, \ldots, t'_n>$, their distance $d_k$ may be measured by the following formula:

$$d = \left( \sum_{i=1}^{n} |t_i - t'_i|^2 \right)^{1/2}$$

and their similarity can be easily derived from their distance. The cosine based vector similarity measure shown below has also been tried.

$$(t_1, \ldots, t_n) \cdot (t'_1, \ldots, t'_n) / \sqrt{\sum_{i=1}^{n} t_i^2} \sqrt{\sum_{i=1}^{n} t_i'^2}$$

However, experience has revealed that it is less sensitive for comparing vectors representing call volumes.

Following is an explanation of how to view cubes as vectors and compare their similarity based on vector distance.

A cube is viewed as a vector of field/value pairs in the following way. A "field" of the vector is identified by the dimension-values underlying a cube cell, and the "value" of that "field" is the cell value. For example:

CB.o(duration 'short', time 'morning', dow 'MON', callee '4089194444')=5 stands for one vector element with field identified by <duration 'short', time 'morning', dow 'MON', callee '4089194444'> and value equals to 5.

Viewing cubes, say $C_1$ and $C_2$, as vectors, allows us to compare their similarity $V(C_1, C_2)$ based on vector distance, as $V:<C_1, C_2> \rightarrow [0,1]$ Further, any sub-cube, or slice or dice, of a cube can also be mapped to a vector, and that allows each pair of corresponding sub-cubes of two cubes to be compared based on vector-distance.

Therefore, given two cubes $C_1[D]$ and $C_2[D]$ with the same underlying dimensions $D=\{D_1, \ldots, D_n\}$, comparing their similarity and putting the comparison results into a similarity cube $C_s[D_s]$, are handled as follows:

1. Define the similarity cube $C_s[D_s]$, with each cell of $C_s$ corresponding to a sub-cube of $C_1$ (and $C_2$), using Type A or Type B cell-to-subcube mapping described above.
2. For each cell e of $C_s$, select the pair of corresponding sub-cubes of $C_1$ and $C_2$, say $c_1$ and $c_2$, then the value of e is the similarity of $c_1$ and $c_2$ compared based on vector-distance, i.e., value(e)=$V(c_1, c_2)$ In the following sections several similarity cubes generated by comparing calling pattern cubes are shown.

F. Volume Based Itemized Similarity Cubes

Decimal cubes "ISIM.I" and "ISIM.d" measure calling pattern similarity on outgoing and incoming call volumes, respectively. Using the Oracle Express language, they are defined as:

define ISIM.o variable decimal <sparse <duration time dow>> inplace define ISIM.d variable decimal <sparse <duration time dow>> inplace Cube "ISIM.o" will be observed for more details. Cube "ISIM.o" is the similarity cube generated from comparing two volume based calling pattern cubes "CB.o" and "CB2.o" (which is defined in the same way as "CB.o"). Cube "ISIM.o" is dimensioned by <duration, time, dow>, but cubes "CB.o" and "CB2.o" are dimensioned by <duration, time, dow callee>. As a result, each cell e of cube "ISIM.o" represents the similarity of a pair of corresponding sub-cubes of cubes "CB.o" and "CB2.o". These sub-cubes are based on the same dimension values as e on duration, time and dow, but on all the values of the callee dimension. The sub-cube comparison is based on "vector-distance" and the "type A cell-to-subcube mapping", as shown in the following algorithm.

Sub-Cube Comparison Algorithm

```
algorithm genISIM
{
    - declare int variables a, b, d
    - limit duration, time, dow to all their values
    - reduce the size of dimension callee by limiting its values to those
      that make either CB.o > O or CB2.o > O
    - compare (in CB.o and CB2.o) the calling volumes for each callee
      and generate a vector-based similarity measure corresponding to
      each combination of duration, time and dow.
    for each dow
    {
        for each time
        {
            for each duration
            {
                d = sqrt (total ((CB.o − CB2.o) * (CB.o − CB2.o)))
                a = sqrt (total (CB.o * CB.o))
                b = sqrt (total (CB2.o * CB2.o))
                conver vector distance to similarity and
                takes some kind of average measure, e.g.,
                ISIM.o = 1 − d/ (a + b)
            }
        }
    }
}
```

Note that the cubes being compared are already rolled up along hierarchical dimension duration, time and dow. This allows cube "ISIM.o" to present dimensioned similarity measures at multiple levels. For example, in the following slice of cube "ISIM.o", the following cell is shown:

ISIM.o (duration 'all', time 'morning', dow 'week')

The above cell represents the volume-based calling pattern similarity for mornings, based on weekly summarization, across all days and all durations.

| | ISIM.o DOW: week | | | |
|---|---|---|---|---|
| | ----------------ISIM.O-------------- | | | |
| | ------------DURATION-------------- | | | |
| TIME | all | Short | Medium | Long |
| allday | 0.90 | 0.87 | 0.64 | 0.89 |
| Night | 0.78 | 0.78 | 1.00 | 1.00 |
| Morning | 0.93 | 0.93 | 0.81 | 0.88 |
| Afternoon | 0.87 | 0.83 | 0.75 | 1.00 |
| Evening | 0.91 | 0.88 | 0.59 | 1.00 |

In the following slice of cube "ISIM.o", the following cell is shown:

ISIM.o (duration 'short', time 'morning', dow 'FRI')

The above cell represents volume-based calling pattern similarity on short calls on Friday mornings.

| | ISIM.o DOW: FRI | | | |
|---|---|---|---|---|
| | ----------------ISIM.O-------------- | | | |
| | ------------DURATION-------------- | | | |
| TIME | all | Short | Medium | Long |
| allday | 0.95 | 0.92 | 0.55 | 0.87 |
| Night | 0.82 | 0.82 | 1.00 | 1.00 |
| Morning | 0.95 | 0.95 | 0.87 | 0.87 |
| Afternoon | 0.95 | 0.91 | 0.66 | 1.00 |
| Evening | 0.95 | 0.91 | 0.49 | 1.00 |

G. Volume Based Similarity Cubes

Similarity cubes "VSIM.o" (for outgoing calls) and "VSIM.d" (or incoming calls) also measure volume-based calling pattern similarity but are dimensioned by levels rather than values of duration, time and dow. They are defined in Oracle Express as, define VSIM.o variable decimal <durLevel, timeLevel, dowLevel> inplace define VSIM.d variable decimal <durLevel, timeLevel, dowLevel> inplace Let us consider cube "VSIM.o" for more details. It is the similarity cube generated by comparing two volume-based pattern cubes "CB.o" and "CB2.o". Dimensioned by <durLevel, timeLevel, dowLevel>, the cell of cube "VSIM.o" corresponding to dimensions values durLevel=$L_d$, timeLevel=$L_t$, and dowLevel=$L_w$, represents the similarity of a pair of corresponding sub-cubes of cubes "CB.o" and "CB2.o". These sub-cubes are based on the dimension values of duration, time and dow at level $L_d$, $L_t$, and $L_w$, respectively, and on all the values of callee dimension. In the following algorithm, "type B cell-to-subcube mapping" is used, and the sub-cube comparison is based on bag-overlap. We can see that more frequently called numbers have higher contribution to pattern comparison, but calls to unmatched destinations have no contribution to the similarity of calling patterns.

Type B "Cell-to-Subcube" Mapping Algorithm

```
algorithm genVSIM.o
{
    - declare int variables a, b, d
    - limit dimensions duration, time, dow to all their values
    - reduce the size of dimensionID by limiting its values to those that
      make either CB.o > O or CB2.o > O
    - compare (in CB.o and CB2.o) the calling volumes for each callee
      then generate bag-intersection based similarity on calling volume
      at each level of dimensions duration, time and dow
    for each dowLevel
    {
        limit dow to values at the current dowLevel
        for each timeLevel
        {
            limit time to values at the current timeLevel
            for each durLevel
            {
                limit time to values at the current timeLevel
                for each durLevel
                {
                    limit duration to values at the current durLevel
                    a = total (CB.o)
                    b = total (CB2.o)
                    d = total (min(CB.o, CB2.o))
                    VSIM.o = (d/a * d/b)/2
                }
            }
        }
    }
}
```

As examples, two cells in the cube "VSIM.o" instance are shown below.

1. Cell VSIM.o (durLevel 'dur_bin', timeLevel 'time_bin', dowLevel 'dd') represents the similarity of a corresponding pair of volume-based sub-cubes of "CB.o" and "CB2.o". These sub-cubes are based on values 'short', 'medium', 'long' of dimension duration, values 'night', 'morning', 'afternoon', 'evening' of dimension time, values 'MON' to 'SUN' of dimension dow, and all values of dimension callee. The value of this cell is the bag-overlap based summarization of cell-wise comparison of the above pair of sub-cubes.

2. Cell VSIM.o (durLevel 'dur_all', timeLevel 'time all', dowLevel 'week') represents the similarity of such a pair of sub-cubes of "CB.o" and "CB2.o" that are based on high-level values of dimensions duration, time and dow, and all values of dimension callee.

| | VSIM.o | |
|---|---|---|
| | ----------VSIM.O--------- | |
| | -------DURLEVEL--------- | |
| TIMELEVEL | dur_all | dur_bin |
| DOWLEVEL: week | | |
| time_all | 0.91 | 0.88 |
| time_bin | 0.91 | 0.87 |
| DOWLEVEL: ww | | |
| time_all | 0.91 | 0.88 |
| time_bin | 0.91 | 0.87 |
| DOWLEVEL: dd | | |
| time_all | 0.87 | 0.84 |
| time_bin | 0.85 | 0.82 |

In general, the degree of similarity may be higher at higher levels of the above dimensions. This is because at time_bin and dur_bin levels, two calls to the same destination at different times of the day and with different duration may be considered somewhat different. However, at top-levels of these dimensions, such a difference is removed since the top-level value of time dimension covers all day, and the top-level value of duration dimension covers any length of call.

H. Probability Based Similarity Cubes

The similarity of volume-based calling patterns is meaningful only when they cover the same time span. This limitation can be eliminated in measuring the similarity of probability-based calling patterns. This is especially useful in comparing a preset calling pattern with an ongoing pattern in real-time.

The following cubes measure the similarity of probability-based calling patterns:

define PSIM.o variable decimal <durLevel, timeLevel, dowLevel> inplace define PSIM.d variable decimal <durLevel, timeLevel, dowLevel> inplace define P1SIM.o variable decimal <durLevel, timeLevel, dowLevel> inplace define P1SIM.d variable decimal <durLevel, timeLevel, dowLevel> inplace Cubes "PSIM.o" and "P1SIM.o" are related to outgoing calls, while cubes "PSIM.d" and "P1SIM.d" are related to incoming calls. Cube "PSIM.o" is used to measure the similarity of calling patterns like cube "P_CB.o" defined before, that take into account the dimensioned probability distribution of a customer's calls over all the calls the customer made. However, cube "P1SIM.o" is used to measure the similarity of calling patterns like cube "P1_CB.o", that take into account the dimensioned probability distribution of a customer's calls dimensioned by callees. The analogous difference exists between cubes "PSIM.d" and "P1SIM.d".

Like cubes "VSIM.o", "PSIM.o" and "P1SIM.o" are also dimensioned by <durLevel, timeLevel, dowLevel>. Each of these similarity cubes is calculated by comparing two probability-based calling pattern cubes based on vector-distance using type B cell-to-subcube mapping. The following algorithm is used to generate cube "P1SIM.o". It takes two calling pattern cubes, "P1_CB.o" and "P1_CB2.o" (defined in the same way as cube "P1_CB.o") as input (since cubes "P1_CB.o" and "P1_CB2.o" are "views" of cubes "CB.o" and "CB2.o", the latter can also be considered input cubes).

Cube "P1SIM.o" Generation Algorithm

```
algorithm genP1SIM
{
    - declare int variables a, b, d
    - limit duration, time, dow to all their values
    - reduce the size of dimensionID by limiting its values to those that make
      either CB.o > O or CB2.o > O (P1_CB.o and P1_CB2.o are derived from
      CB.o and CB2.o)
    - compare pair-wisely (in P1_CB.o and P1_CB2.o) to each callee the calling
      probability over the calls to that callee, then generate a vector-based
      similarity measure corresponding to each level of duration, time and dow
      dimensions.
    for each dowLevel
    {
        limit dow to values at the current dowLevel
        for each timeLevel
        {
            limit time to values at the current timeLevel for each durLevel
            {
                limit duration to values at the current durLevel)
                d = sqrt (total ((P1_CB.o - P1_CB2.o) * (P1_CB.o - P1_CB2.o)))
                a = sqrt (total (P1_CB.o * P1_CB.o))
                b = sqrt (total (P1_CB2.o * P1_CB2.o))
                conver vector distance to similarity and
                take some kind of average measure, e.g.,
                P1SIM.o = 1 - d/(a + b)
            }
        }
    }
}
```

An instance of 'P1SIM.o' is illustrated below. Let us look at the following two cells that are based on the same dimension values as the cells shown in the above cube "VSIM.o" examples.

1. Cell P1SIM.o (durLevel 'dur_bin', timeLevel 'time_bin', dowLevel 'dd') represents the similarity of a corresponding pair of probability-based sub-cubes of "P1_CB.o" and "P1_CB2.o". These sub-cubes are based on low-level values of dimension duration, time, dow and all values of dimension callee. The value of the above cell is the vector-based summarization of cell-wise comparisons of the above pair of sub-cubes.

2. Cell P1SIM.o (durLevel 'dur_all', timeLevel 'time_all', dowLevel 'week') represents the similarity of such a pair of sub-cubes of "P1_CB.o" and "P1_CB2.o" that are based on high-level values of dimension duration, time and dow, and all values of dimension callee.

P1SIM.o

| TIMELEVEL | P1SIM.O DURLEVEL | |
|---|---|---|
| | dur_all | dur_bin |
| DOWLEVEL: week | | |
| time_all | 1.00 | 0.71 |
| time_bin | 0.94 | 0.70 |
| DOWLEVEL: ww | | |
| time_all | 0.95 | 0.72 |
| time_bin | 0.92 | 0.71 |
| DOWLEVEL: dd | | |
| time_all | 0.77 | 0.63 |
| time_bin | 0.73 | 0.61 |

The size of each profile cube may be controlled by partitioning the customers represented in a profile cube by area; and by limiting the profiling period.

Multiple calling pattern cubes may be generated to represent a customer's calling behavior from different aspects. According to one design, several calling pattern cubes representing "probability-based information" are actually derived from intermediate calling pattern cubes representing "volume-based information".

Let us consider a volume-based cube V for a single customer derived from the above profile cube by totaling outgoing calls over days of week. V holds the counts of calls during the profiling period dimensioned by <time, duration, callee>, where dimension time has values 'morning', 'evening', etc; duration has values 'short', 'long', etc; and dimension callee contains the called phone numbers. A cell in the cube is identified by one value from each of these dimensions. The value in a cell identified by duration='short', time='morning', callee='4089194444', is the number of calls made from this customer to '4089194444' in the mornings (say, 8-12 a.m.) that are 'short' (say, less than 20 min), during the profiling period.

From cube V the following different probability cubes (and others) may be generated:

1. $C_{pri}$ or the prior probability of time-bin of calls with respect to each callee, that is dimensioned by <time, callee>, and indicates the percentage of calls made in 'morning', 'afternoon', 'evening' and 'night', respectively.

2. $C_p$ for the conditional probability of call duration-bin given time-bin of calls with respect to each callee, that is dimensioned by <time, duration, callee>, indicates the percentage of calls that are 'long', 'medium' and 'short', respectively, given the time-bin.

3. $C_{con}$ for the probabilistic consequence of the above; i.e., the probability of calls in every cell crossing dimensioned by <time, duration, callee> over the total calls.

In fact, all the above probability cubes, $C_{pri}$, $C_p$, and $C_{con}$, can be derived from cube V using OLAP operations. In the Oracle Express OLAP language, these are expressed as $C_{pri}$=total(V, time, callee)/total(V, callee)
$C_p$=(V/$C_{pri}$)/total(V, callee)
$C_{con}$=V/total(V, callee)

In the above expressions, "total" is a typical OLAP operation on cubes with numerical cell values. While "total(V)" returns the total of the cell values of V, "total(V, callee)" returns such a total dimensioned by "callee, total(V, time, callee)" returns such a total dimensioned by "time" and "callee". In fact, a dimensioned "total" represents a cube. The arithmetic operations on cubes, such as "/" used above, are computed cell-wise.

Figure 2:
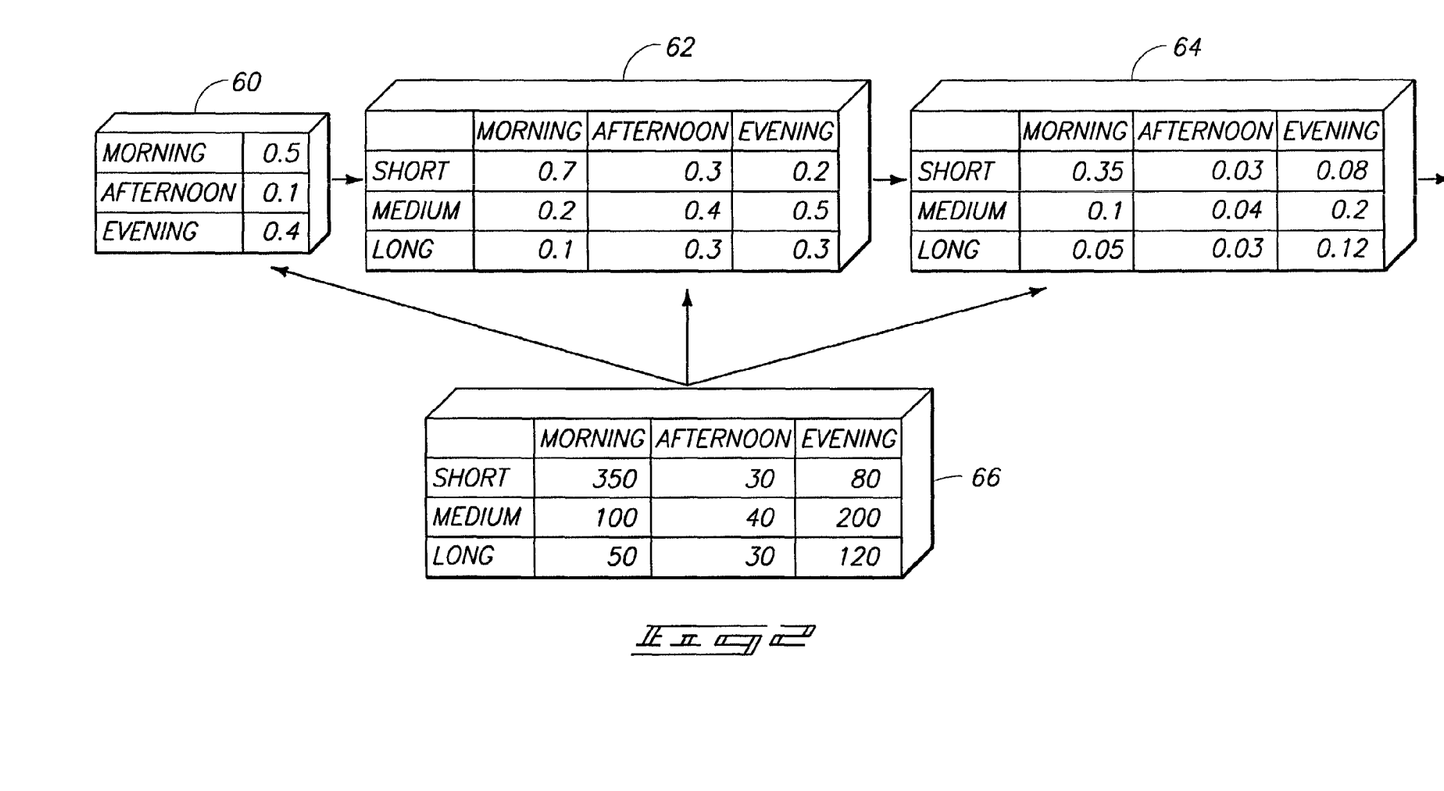
FIG. 2 is a conceptual diagram illustrating the derivation of probability cubes from volume cubes in the form of persistent data warehouse objects.

One example illustrating the derivation of probability cubes from volume cubes is shown in FIG. 2. According to FIG. 2, the derivation of probability cubes 60, 62 and 64 is illustrated from a volume cube 66. More particularly, volume cube 66 represents a volume-based cube, V, from which cubes 60, 62 and 64 are derived. Cube 60 represents prior probability cube $C_{pri}$. Cube 62 represents conditional probability cube $C_p$. Cube 64 represents probabilistic consequence cube $C_{con}$.

With the above mechanism it is only necessary to make volume cubes persistent data-warehouse objects. In the other worlds, only the volume based information needs to be profiled, and calling patterns, either based on volume or probability, can be derived. This shows the simplicity, and yet powerfulness, of using OLAP to handle probability based profiling.

III. Architecture of the Profiling Engine

The profiling engine 16 (of FIG. 1) provides the following major functions:
1. Building and incrementally updating customer calling behavior profiles by mining call records flowing into the data-warehouse
2. Maintaining profiles by staging data between the data-warehouse and the OLAP multidimensional database.
3. Deriving multilevel and multidimensional customer calling patterns from profiles for analysis.
4. Comparing the similarity of customer calling patterns from volume and probability distribution points of view, and generating multilevel and multidimensional similarity measures, to be used in such applications as fraud detection.

The profiling engine is built on top of an Oracle-8 based data-warehouse and Oracle Express, an OLAP server. Call data records, customer behavior profiles and other reference data are stored in warehouse 46 (of FIG. 1). Call data records are fed in daily and dumped to archive after use. OLAP server 14 (of FIG. 1) is used as a computation engine for creating and updating profiles, deriving calling patterns from profiles, as well as analyzing and comparing calling patterns.

Figure 3:
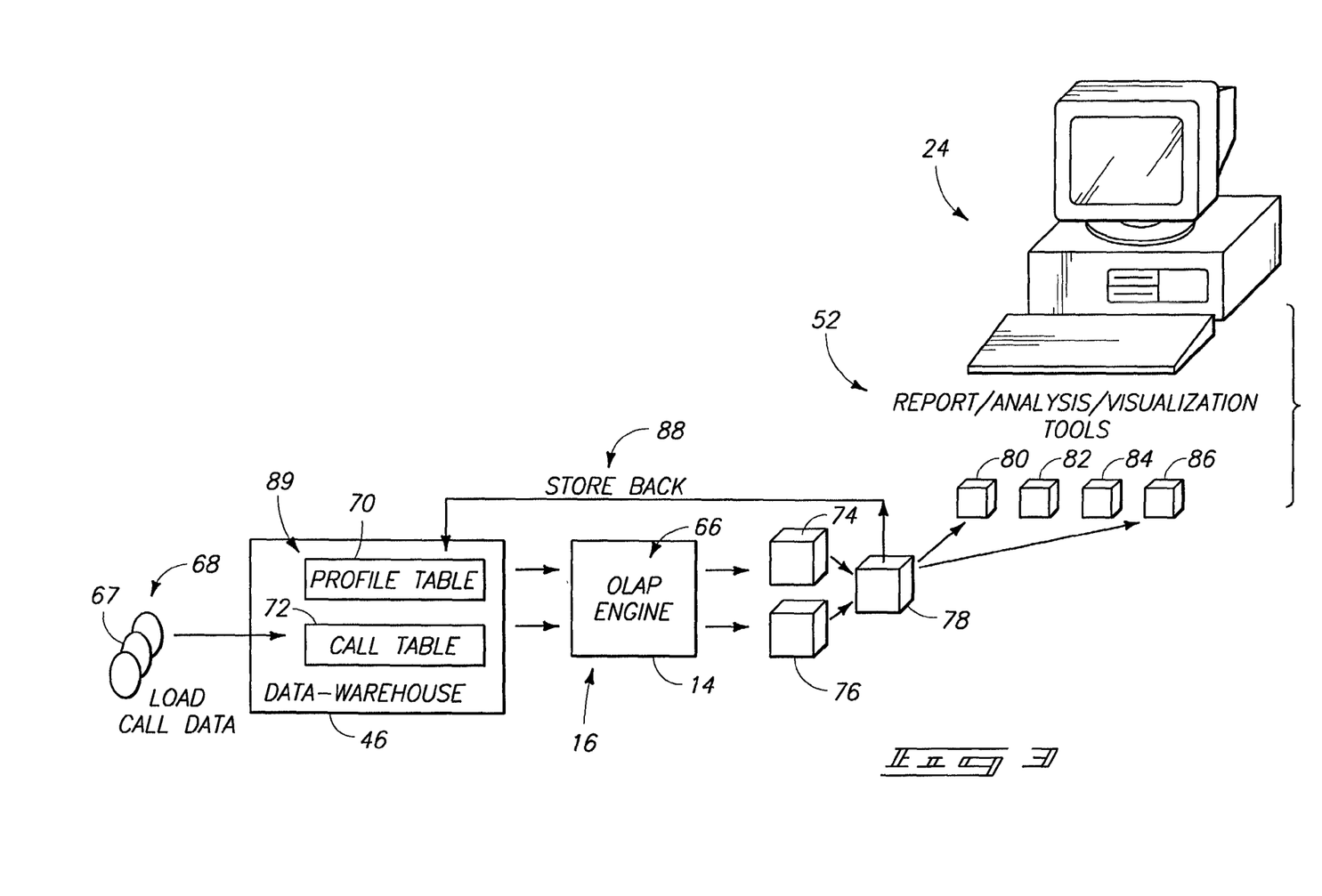
FIG. 3 is a schematic block diagram illustrating a profiling engine architecture according to the present invention including a data warehouse and an OLAP server.

FIG. 3 illustrates one exemplary data-warehoused OLAP based profiling engine architecture. According to the implementation depicted in FIG. 3, customer profiling is repeated periodically. For example, customer profiling is implemented on a daily basis. More particularly, call records 67, in the form of call data 68, are loaded into call data tables 72 that are provided within data-warehouse 46. Call data tables 72 are then loaded into OLAP server 14 in order to generate a "profile-snapshot" cube 74 that is multi-customer oriented. As shown in FIG. 3, data-warehouse 46 also includes a profile table 70. Additionally, OLAP server 14 is provided within profiling engine 16, which further includes OLAP engine 66 (which is formed by part of profiling engine 16).

Parallel with the above-described previous step, a profile cube 76 is retrieved from data-warehouse 46 via OLAP server 14, and based upon information provided within data-warehouse 46. Profile cube 76 covers the same set of customers as were used to derive profile-snapshot cube 74. Subsequently, profile cube 76 is updated by merging profile cube 76 with profile-snapshot cube 74 so as to form an updated profile cube 78. Updated profile cube 78 is then stored back in profile table 70 provided within data-warehouse 46 by way of feedback loop 88. The frequency of data exchange occurring between data-warehouse 46 and OLAP server 14 is controlled by specific data staging policies that are implemented therebetween. Updated profile cube 78 is further parsed into calling pattern cubes 80, 82, 84 and 86 of individual customers according to previously described techniques. Additionally, OLAP tools 52 covering reporting, analysis, and visualization techniques are provided within client 24.

In order to reduce data redundancy and query cost, one goal is to maintain minimal data in the profile tables in the data-warehouse. Multiple customers calling information can be included in a single profile table or profile cube, without separating information on outgoing calls and incoming calls. The relational schema of the profile table can be made to directly correspond to the base level of the profile cube. Derivable values at higher levels are not maintained in data-warehouse 46 (of FIG. 3).

Below is the Oracle-8 schema of profile table 70 (of FIG. 3), herein identified as "Profile", where "pc" is the number of calls dimensioned by other attributes:

TABLE 4

Oracle-8 Table Schema

```
// Oracle8 table schema
CREATE TABLE Profile
(
    caller      VARCHAR2(10)    NOT NULL,
    callee      VARCHAR2(10)    NOT NULL,
    duration    CHAR(1)         NOT NULL,
    time        CHAR(1)         NOT NULL,
    dow         char(1)         NOT NULL,
    pc          INTEGER
)
STORAGE ...;
```

The corresponding profile cube, PC, is defined in Oracle Express as shown below, where dow stands for day_of_week (e.g., Monday, . . . , Sunday), as mentioned before:

//Oracle Express cube definition

Define PC variable int <sparse <duration time dow callee caller>> inplace

It can be seen that the attributes of table "Profile" has one-to-one correspondence to the dimensions, including the output dimension, of cube PC. This arrangement makes data staging straightforward.

OLAP is used to handle the following tasks:
1. Retrieve profile tables to generate "profile" cubes.
2. Retrieve call data tables to create "profile-snapshot" cubes. Profile-snapshot cubes and profile cubes have the same dimensions, with cell values representing number of calls. As a result, a profile-snapshot cube and a profile cube covering the same group of callers can be easily merged by addition.
3. Derive individual customer based "calling pattern" cubes from profile cubes. Various kinds of pattern cubes are defined. By rolling up these cubes, multilevel calling patterns can be supported.

4. Analyze individual calling patterns in multiple dimensions and at multiple levels.
5. Compute the similarity of calling patterns that belong to different customers or belong to the same customer but cover different profiling periods. Using OLAP operations pattern similarity may be compared from different aspects (e.g., volume or probability distribution), in different dimensions (e.g., weekday behavior, or evening behavior regardless of which day of the week), and at different levels (e.g., daily or weekly).

OLAP engine 66 (of FIG. 3) actually serves as a scalable computation engine. From a performance point of view, engine 66 supports indexed caching, reduces database access dramatically and extends main memory based reasoning. From a functionality point of view, engine 66 allows one to deliver powerful solutions for profiling, pattern generation, analysis and comparison, in a relatively simple and flexible manner.

IV. Profile Cubes and Calling Pattern Cubes

As described above, two general kinds of cubes are introduced. First, multi-customer based profile cubes and, secondly, single customer based calling pattern cubes.

A. Profile Cubes

A profile cube (PC) 76 (of FIG. 3) and a profile-snapshot cube (PCS) 74 (of FIG. 3) have the same underlying dimensions, and contain profiling information of multiple customers in direct correspondence with the relational tables in data-warehouse 46 (of FIG. 3). In the Oracle Express language they are defined as define PC variable int <sparse <duration time dow callee caller>> inplace define PCS variable int <sparse <duration time dow callee caller>> inplace where callee and caller are called and calling numbers; dimension time has values 'morning', 'evening', etc, for time-bins; dimension duration has values representing duration-bins (e.g., 'short'); and dimension dow has values representing days of week (e.g., 'MON').

Note that the use of keyword "sparse" in the above definitions instructs Oracle Express to create a composite dimension <duration time dow callee caller>, in order to handle sparseness, particularly between calling and called numbers, in an efficient way. A composite dimension is a list of dimension-value combinations. A combination is an index into one or more sparse data cubes. The use of a composite dimension allows storing sparse data in a compact form similar to relation tuples.

FIG. 4 illustrates the population of profile-snapshot cube (PCS) 74 by use of "binning". A call data record 50 contains fields 90, 92 and 94, 96 with values mapping to each dimension of the PCS cube 74. Such mapping is referred to as "binning". For example, '9 am' is mapped to time-bin 'morning', 5 minutes is mapped to duration-bin 'short'. A call made at 9 am and lasting 5 minutes falls into the cell corresponding to time='morning' and duration='short'.

As shown in FIG. 3, profile cube (PC) 76 is retrieved from a database 89 in data-warehouse 46 and updated by merging with PCS 74, and then stored back into database 89. In Oracle Express, the merge of PC 76 and PCS 74 is simply expressed as:

$$PC=PC+PCS$$

In this way customer profiles are updated incrementally as each new batch of call data records 67 flows into data-warehouse 46 (of FIG. 3).

B. Hierarchical Dimensions for Multilevel Pattern Representation

Calling pattern cubes are derived from profile cubes and used to represent the calling behavior of individual customers. In order to represent such calling behavior at multiple levels, dimensions dow, time and duration are defined as hierarchical dimensions, along which the calling pattern cubes can be rolled up.

A hierarchical dimension D contains values at different levels of abstraction. Associated with D there are a dimension DL describing the levels of D, a relation DL_D mapping each value of D to the appropriate level, and a relation D_D mapping each value of D to its parent value (the value at the immediate upper level). Let D be an underlying dimension of a numerical cube C such as a volume-based calling pattern cube. D, together with DL, DL_D and D_D, fully specify a dimension hierarchy. They provide sufficient information to rollup cube C along dimension D; that is, to calculate the total of cube data at the upper levels using the corresponding lower-level data. A cube may be rolled up along multiple underlying dimensions.

1. Dow Hierarchy

The dow hierarchy is made of the following objects:
a. dow(day of week): dimension with values 'MON', ... 'SUN' at the lowest level (dd level), 'wkday', 'wkend' at a higher level (ww level), and 'week' at the top level ('week' level).
b. dowLevel: dimension with values 'dd', 'ww', 'week'
c. dow_dow: relation (dow, dow) for mapping each value to its parent value; e.g.,
dow_dow(dow 'MON') 'wkday'
...
dow_dow(dow 'SAT')='wkend'
dow_dow(dow 'wkday')='week'
dow_dow(dow 'wkend')='week'
dow_dow(dow 'week')=NA
d. dowLevel_dow: relation (dow, dowLevel) for mapping each value to its level; e.g.,
dowLevel dow(dow 'MON')='dd'
...
dowLevel_dow(dow 'wkday')='ww'
dowLevel dow(dow 'wkend')='ww'
dowLevel dow(dow 'week')='week'

2. Time Hierarchy

The time hierarchy is made of the following objects.
a. time: dimension with values 'night', 'morning', 'afternoon' and 'evening' at 'time_bin' level (bottom-level), and 'allday' at the 'time_all' level (top-level).
b. timeLevel: dimension with values 'time_bin' and 'time_all'.
c. time_time: relation (time, time) for mapping each value to its parent value; e.g.,
time_time(time 'morning')='allday'
...
time_time(time 'allday')=NA
d. timeLevel_time: relation (time, timeLevel) for mapping each value to its level; e.g.,
timeLevel_time(time 'morning')='time bin'
timeLevel_time(time 'allday')='time_all'

3. Duration Hierarchy

The duration hierarchy is made of the following objects:
a. duration: dimension with values 'short', 'medium', 'long' at 'dur_bin' level (bottom-level, and 'all' and 'dur_all' level (top-level)
b. durLevel: dimension with values 'dur_bin' and 'dur_all'
c. dur_dur: relation (duration, duration) for mapping each value to its parent value; e.g., dur_dur(duration 'short')='all'
...
dur_dur(duration 'all')=NA
d. durLevel_dur: relation (duration, durLevel) for mapping each value to its level; e.g.,
durLevel_dur(duration 'short')='dur_bin'
...
durLevel_dur(duration 'all')='dur_all'

For profile storage, combination and updating, only the bottom levels are involved, therefore rolling up profile cubes such as PC is unnecessary. Rolling up is only applicable to calling pattern cubes for analysis purposes.

C. Cubes Representing Volume-Based Calling Patterns

A calling pattern cube is associated with a single customer for representing the individual calling behavior of that customer. As the calling behavior of a customer may be viewed from different aspects, different kinds of calling pattern cubes may be defined. These cubes are commonly dimensioned by time, duration and dow (day of week), and in addition, for those related to outgoing calls, dimensioned by callee, and for those related to incoming calls, dimensioned by caller. Their cell values represent the number of calls, the probability distributions, etc. Calling pattern cubes are derived from profile cubes, say, PC, and then rolled up. Below are some examples.

1. Volume Based Calling Patterns

Cube "CB.o" represents the outgoing calling behavior of a customer. In Oracle Express that representation is defined by:
define CB.o variable int <sparse <duration time dow callee>> inplace Similarly, cube "CB.d" representing incoming calling behavior is defined by:
define CB.d variable int <sparse <duration time dow caller>> inplace The cell values of these cubes are the number of calls falling into the given 'slot' of time, duration, day of week, etc. When generated, cubes "CB.o" and "CB.d" are rolled up along dimensions duration, time and dow. Therefore, CB.o(duration 'short', time 'morning', dow 'MON')

measures the number of short-duration calls this customer made to each callee (dimensioned by callee) on Monday mornings during the profiling interval. Similarly, CB.o(duration 'all', time 'allday', dow 'week')

measures the number of calls this customer made to each callee (total calls dimensioned by callee) during the profiling interval.

2. An Algorithm for Deriving Calling Pattern Cube

Below an algorithm is shown for generating the calling pattern cube "CB.o" from profile cube PC defined above. Other calling pattern cubes can be generated in the similar way.

Cube "PC" is pre-populated using the data retrieved from database table "Profile" and possibly combined with cube PCS that is generated from loading call data. With the following algorithm, a calling pattern cube, "CB.o", is populated for a given customer as specified by parameter customer_callID.

Derive Calling Pattern Cubes Algorithm

```
define genCB (customer_callID text)
{
    - if customer_callID is not a value of caller then return
    - remove old cells of CB.o by
        limit dimensions duration, time, dow and callee to all their
            values
        CB.o = NA
    - limit dimensions duration, time, dow to their bottom level
        values
    - limit dimension caller to the given customer by
        limit caller to customer_callID
    - limit dimension callee to those being called by the given
        customer,
        as limit callee to any(PC > O, callee)
    - form a subcube of PC by selecting only the data related to
        the given customer (the current value of caller dimension),
        then transfer (unravel) its cell values to cube CB.o, as
        CB.o = unravel(total(PC, duration time dow callee))
    - rollup CB.o by
        limit duration, time, dow to all their values
        rollup CB.o over duration using dur_dur
        rollup CB.o over time using time_time
        rollup GB.o over dow using dow_dow
}
```

D. Cubes Representing Probability Distribution Based Calling Patterns

Cubes representing probability distribution based calling patterns are derived from volume-based pattern cubes. Depending on application requirement various cubes may be derived. Two kinds of such cubes are listed below.

1. Probability Distribution on All Calls

Cube "P_CB.o" for a customer represents the dimensioned probability distribution of outgoing calls over all the outgoing calls made by this customer, and is derived from cube "CB.o" in the following way:

define P_CB.o formula decimal <duration time dow callee>

EQ (CB.o/total(CB.o(duration 'all', 'allday', dow 'week')))

where total(CB.o(duration 'all', 'allday', dow 'week')) is the total calls this customer made to all callees. Remember that cube "CB.o" has already been rolled up, hence we can use its top-level value. The value of a cell is the above probability which corresponds to the underlying dimension values.

2. Probability Distribution on Calls to Each Callee

Cube "P1_CB.o" is dimensioned by duration, . . . and callee, and represents the probability distribution of a customer's outgoing calls over the customer's total calls to the corresponding callee, and is also derived from cube "CB.o" as specified in the following, define P1_CB.o formula decimal <duration time dow callee>

EQ (CB.o/total(CB.o(duration 'all', 'allday', dow 'week'), callee))

where "total(CB.o(duration 'all', 'allday', dow 'week'), callee)" is the total number of calls this customer made to each callee (dimensioned by callee). The value of a cell is the above probability corresponding to the underlying dimension values.

Calling pattern cubes for incoming calls can be defined in a similar manner.

V. CONCLUSIONS

The problem of customer behavior profiling occurs in many applications such as telecommunications and electronic commerce. Pursuant to Applicant's techniques, a data-warehouse and OLAP based framework for customer behavior profiling has been described particularly with reference to its use in one specific telecommunication application.

A prototype has been implemented on top of an Oracle-8 based data-warehouse with an Oracle Express OLAP server. This prototype has demonstrated the practical value of using OLAP server as a scalable computation engine for creating and updating profiles, deriving calling patterns from profiles, as well as analyzing and comparing calling patterns.

Additionally, the customer behavior profiling described above can be further scaled by developing a multilevel, distributed profiling framework incorporated with a dynamic agent infrastructure.

Figure 5:
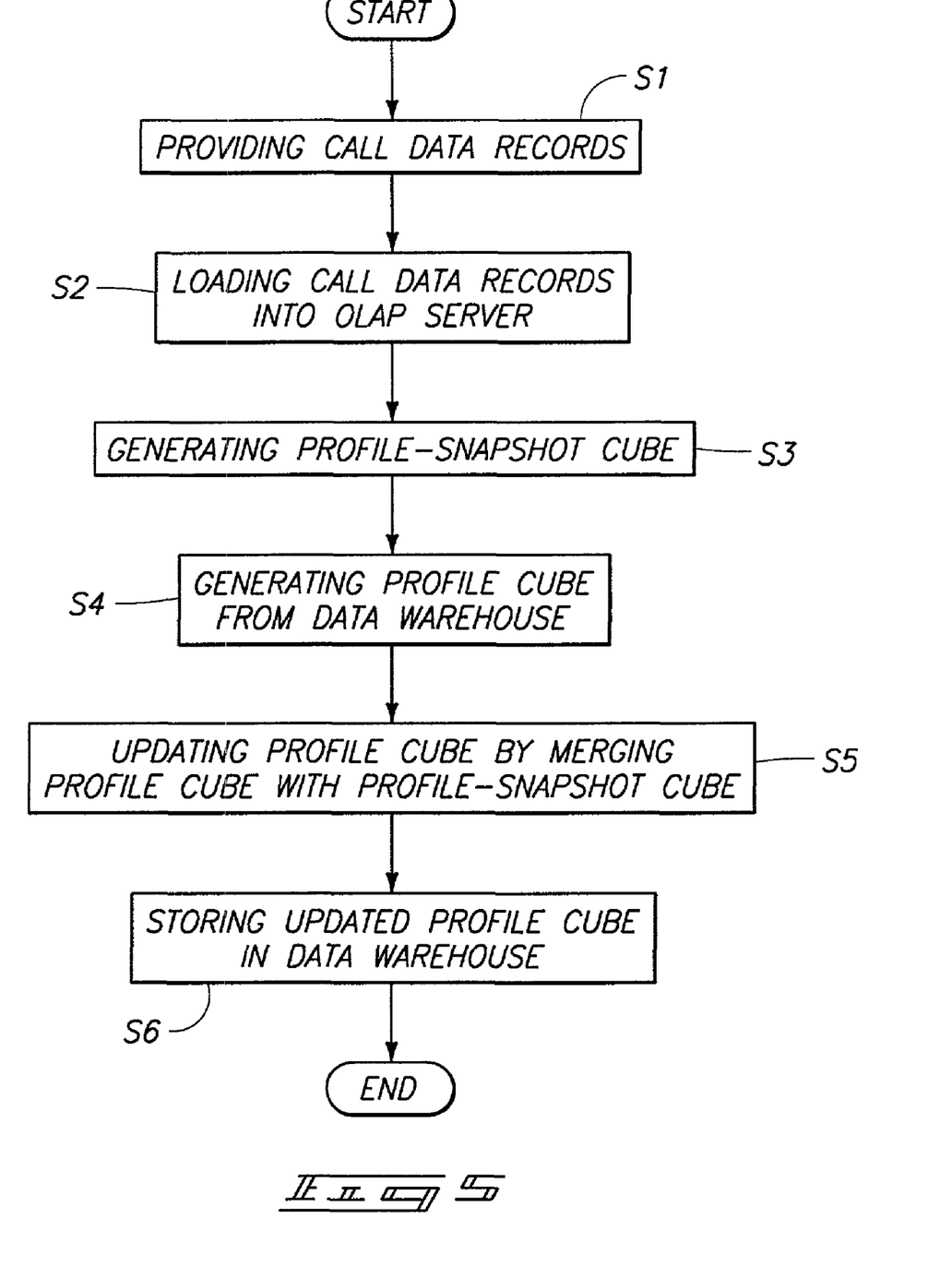
FIG. 5 is a logic flow diagram illustrating the steps performed when profiling customer behavior according to the present invention.
Figure 7:
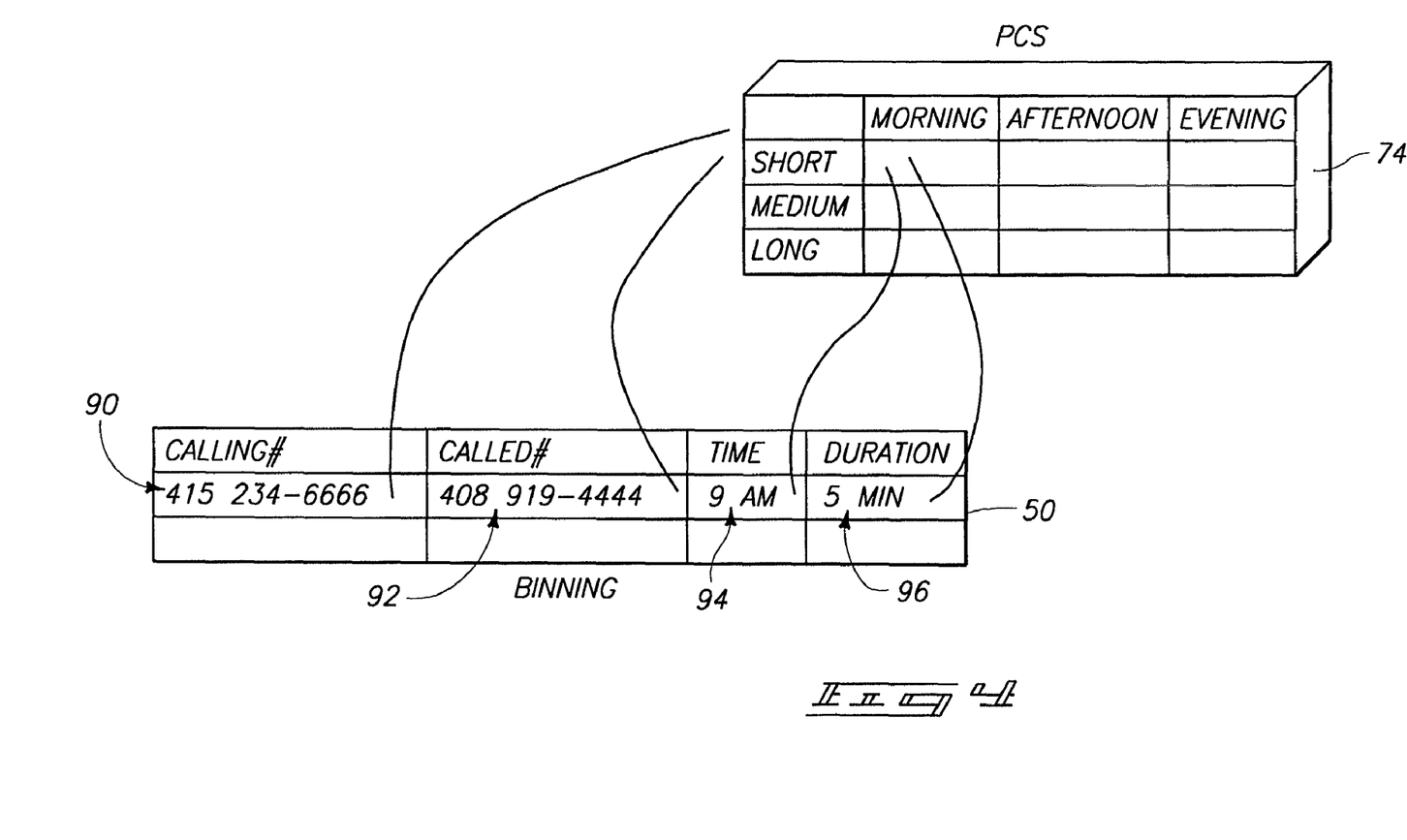

FIG. 5 discloses a logic flow diagram for the programming of general circuitry, or processing circuitry, present within profiling apparatus 10 of data mining system 18 (of FIG. 1). The following steps list a method for comparing customer behavior patterns.

In Step "S1", call data is provided in the form of call data records to a data-warehouse. After performing Step "S1", the process proceeds to Step "S2".

In Step "S2", the process loads the call data records into an OLAP server. After performing Step "S2", the process proceeds to Step "S3".

In Step "S3", the process generates a profile-snapshot cube accommodating multiple customers. After performing Step "S3", the process proceeds to Step "S4".

In Step "S4", in combination with generating the profile-snapshot cube, the process generates a profile cube for the same set of customers from the data warehouse. After performing Step "S4", the process proceeds to Step "S5".

In Step "S5", the process updates the profile cube by merging the profile cube with the profile-snapshot cube. After performing Step "S5", the process proceeds to Step "S6".

In Step "S6", the process stores the updated profile cube in the data-warehouse. After performing Step "S6", the process is terminated.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A customer profiling apparatus for conducting customer telephone behavior pattern analysis on telephone call records including telephone call data, comprising:
   processing circuitry operative to process customer telephone call records;
   a data warehouse coupled with the processing circuitry and configured to store the processed customer telephone call records;
   an OnLine Analytical Processing (OLAP) based scalable profiling engine communicating with the data warehouse and operative to build and update customer behavior profiles by mining the customer telephone call records that flow into the data warehouse; and
   at least one computer program, performed by the profiling engine, and operative to define behavior profiles defined at least in part by probability distributions, using data from the telephone call records, as data cubes and derive similarity measures on patterns extracted from the behavior profiles;
   wherein the behavior profiles are provided as two input calling pattern cubes, $C_1$ and $C_2$, and a similarity cube, $C_s$, is an output of a comparison between $C_1$ and $C_2$, wherein the similarity cube, $C_s$, represents a pair of corresponding sub-cubes of $C_1$ and $C_2$, and wherein $C_1$ and $C_2$ are count-cubes, a sub-cube is treated as a bag, and cell-wise comparison results are summarized based on bag overlap, the count cubes having non-negative integer cell values, and the bag overlap enables comparison of corresponding sub-cubes of distinct count cubes.

2. The apparatus of claim 1 wherein the profiling engine comprises a commercial data warehouse server and a multi-dimensional OLAP server.

3. The apparatus of claim 1 wherein the profiling engine implements multi-level, multi-dimensional pattern analysis and comparison.

4. The apparatus of claim 1 wherein similarity measures are defined and computed on the patterns extracted from the behavior profiles.

5. The apparatus of claim 1 wherein the computer program is further operative to compare the data cubes with similarity measures identifying fraud so as to extract fraud detection from the behavior profiles.

6. The apparatus of claim 1 wherein the behavior profiles are analyzed against a personalized threshold to detect caller fraud.

7. The apparatus of claim 1 wherein the customer records comprise customer call records, the profiling engine builds and updates customer calling behavior profiles by mining the customer call records, and the computer program derives similarity measures on patterns extracted from the call behavior profiles.

8. The apparatus of claim 1 wherein a cell of $C_s$ is mapped into a pair of corresponding sub-cubes of $C_1$ and $C_2$.

9. The apparatus of claim 1, wherein each cell of $C_s$ represents the similarity of a pair of corresponding sub-cubes.

10. A profiling apparatus, comprising:
    a data warehouse for storing customer records including telephone call data;
    a profiling engine having a processor and configured to communicate with the data warehouse and operative to generate customer telephone calling behavior profiles from the customer records within the data warehouse, the profiling engine being configured to define customer telephone calling behavior profiles using probability distributions, and to compute the customer telephone calling behavior profiles using OLAP operations on multi-dimensional and multi-level data cubes, one multi-level data cube being a profile cube, another multi-level data cube being a profile-snapshot cube, and yet another data cube being a profile cube formed by merging together the profile cube and the profile-snapshot cube; and
    a computer application program implemented on the profiling engine and operative to represent behavior profiles as patterns, using the telephone call data, and derive similarity measures of the patterns usable to profile customer behavior and detect fraud by deriving calling pattern cubes from the profile cubes using a probability distribution-based calling pattern, treating a sub-cube as a bag, and summarizing cell-wise comparison results based on bag overlap.

11. The apparatus of claim 10 wherein the updated profile cube is stored within a profile table of the data warehouse such that subsequent customer profiling utilizes customer records from the data warehouse comprising the updated profile cube.

12. A method for comparing customer behavior patterns, comprising:
    providing call data in the form of call data records to a data warehouse;

loading the call data records into a multidimensional database of an OLAP server;

maintaining profiles by staging data between the data warehouse and the OLAP multidimensional database;

generating, using a system having a processor, a profile-snapshot cube accommodating multiple customers;

in combination with generating the profile-snapshot cube, generating a profile cube for the same set of customers from the data warehouse;

updating the profile cube by merging the profile cube with the profile-snapshot cube;

storing the updated profile cube in the data warehouse; and deriving similarity measures of patterns usable to profile customer behavior and detect fraud by deriving calling pattern cubes from the updated profile cube using a probability distribution-based calling pattern, treating a sub-cube as a bag, and summarizing cell-wise comparison results based on bag overlap.

13. The method of claim 12 wherein the data warehouse comprises profile tables configured to store the profile cube.

14. The method of claim 12 wherein the updated profile cube is subdivided into a plurality of individual calling pattern cubes, each representative of individual customers, and further comprising comparing_calling patterns that have been derived from customer calling behavior profiles.

15. The method of claim 14 further comprising the steps of reporting, analyzing, and visualizing of one of the calling pattern cubes for an individual customer.

16. The method of claim 14 further comprising retrieving profile tables to generate the profile cubes, retrieving call data tables to create profile-snapshot cubes that have a same dimension of a profile cube to facilitate merging by addition, deriving individual customer-based calling pattern cubes from the profile cubes, analyzing individual calling patterns in multiple dimensions and multiple levels, and computing a similarity of calling patterns that belong to different customers or to a same customer over different profiling periods.

17. A profiling apparatus, comprising:

a data warehouse for storing customer records including telephone call data;

a profiling engine having a processor and configured to communicate with the data warehouse and operative to generate customer telephone calling behavior profiles from the customer records within the data warehouse, the profiling engine being configured to define customer telephone calling behavior profiles using probability distributions, and to compute the customer telephone calling behavior profiles using OLAP operations on multi-dimensional and multi-level data cubes, one multi-level data cube being a profile cube, another multi-level data cube being a profile-snapshot cube, and yet another data cube being a profile cube formed by merging together the profile cube and the profile-snapshot cube; and a computer application program implemented on the profiling engine and operative to represent behavior profiles as patterns, using the telephone call data, and derive similarity measures of the patterns usable to profile customer behavior and detect fraud by deriving volume based calling pattern cubes comprising count-cubes from the profile cubes using a probability distribution-based calling pattern, treating a sub-cube as a bag, and summarizing cell-wise comparison results based on bag overlap using cell-to-subcube mapping, the count cubes having non-negative integer cell values, and the bag overlap enables comparison of corresponding sub-cubes of distinct count cubes.

18. The apparatus of claim 17 wherein the computer application program is operative to implement projection cell-to-subcube mapping.

19. The apparatus of claim 17 wherein the computer application program is operative to implement change level cell-to-subcube mapping.

20. A customer profiling apparatus for conducting customer telephone behavior pattern analysis on telephone call records including telephone call data, comprising:

processing circuitry operative to process customer telephone call records;

a data warehouse coupled with the processing circuitry and configured to store the processed customer telephone call records;

an OnLine Analytical Processing (OLAP) based scalable profiling engine, communicating with the data warehouse and operative to build and update customer behavior profiles by mining the customer telephone call records that flow into the data warehouse; and at least one computer program, performed by the profiling engine, and operative to define behavior profiles defined at least in part by probability distributions, using data from the telephone call records, as data cubes and derive similarity measures on patterns extracted from the behavior profiles;

wherein the behavior profiles are provided as two input calling pattern cubes, $C_1$ and $C_2$, and a similarity cube, $C_s$, is an output of a comparison between $C_1$ and $C_2$, wherein the similarity cube, $C_s$, represents a pair of corresponding sub-cubes of $C_1$ and $C_2$, and wherein $C_1$ and $C_2$ are count-cubes, a sub-cube is treated as a bag, and cell-wise comparison results are summarized based on bag overlap, wherein each cell of $C_s$ represents the similarity of a pair of corresponding sub-cubes, a cube having a set of dimensions and each cell of the cube being identified by a value from each of the dimensions.

21. The apparatus of claim 20, wherein an element of the bag is identified by a list of dimension values underlying a cell of the cube, and a count of the element is represented by a cell value.

22. The apparatus of claim 20, wherein the count cubes having non-negative integer cell values, and the bag overlap enables comparison of corresponding sub-cubes of distinct count cubes.

23. The apparatus of claim 20, wherein each cell of Cs represents the similarity of a pair of corresponding sub-cubes.

* * * * *

UNITED STATES PATENT AND TRADEMARK OFFICE
CERTIFICATE OF CORRECTION

| | | |
|---|---|---|
| PATENT NO. | : 7,822,629 B2 | Page 1 of 1 |
| APPLICATION NO. | : 09/464311 | |
| DATED | : October 26, 2010 | |
| INVENTOR(S) | : Qiming Chen et al. | |

It is certified that error appears in the above-identified patent and that said Letters Patent is hereby corrected as shown below:

In column 17, line 36, after "data-warehouse" insert -- daily, using an OLAP server. --.

In column 25, line 24, in Claim 14, delete "comparing_calling" and insert -- comparing calling --, therefor.

In column 26, line 26, in Claim 20, delete "engine," and insert -- engine --, therefor.

In column 26, line 55, in Claim 23, delete "Cs" and insert -- $C_s$ --, therefor.

Signed and Sealed this
Fifteenth Day of March, 2011

David J. Kappos
*Director of the United States Patent and Trademark Office*